Figure 1:
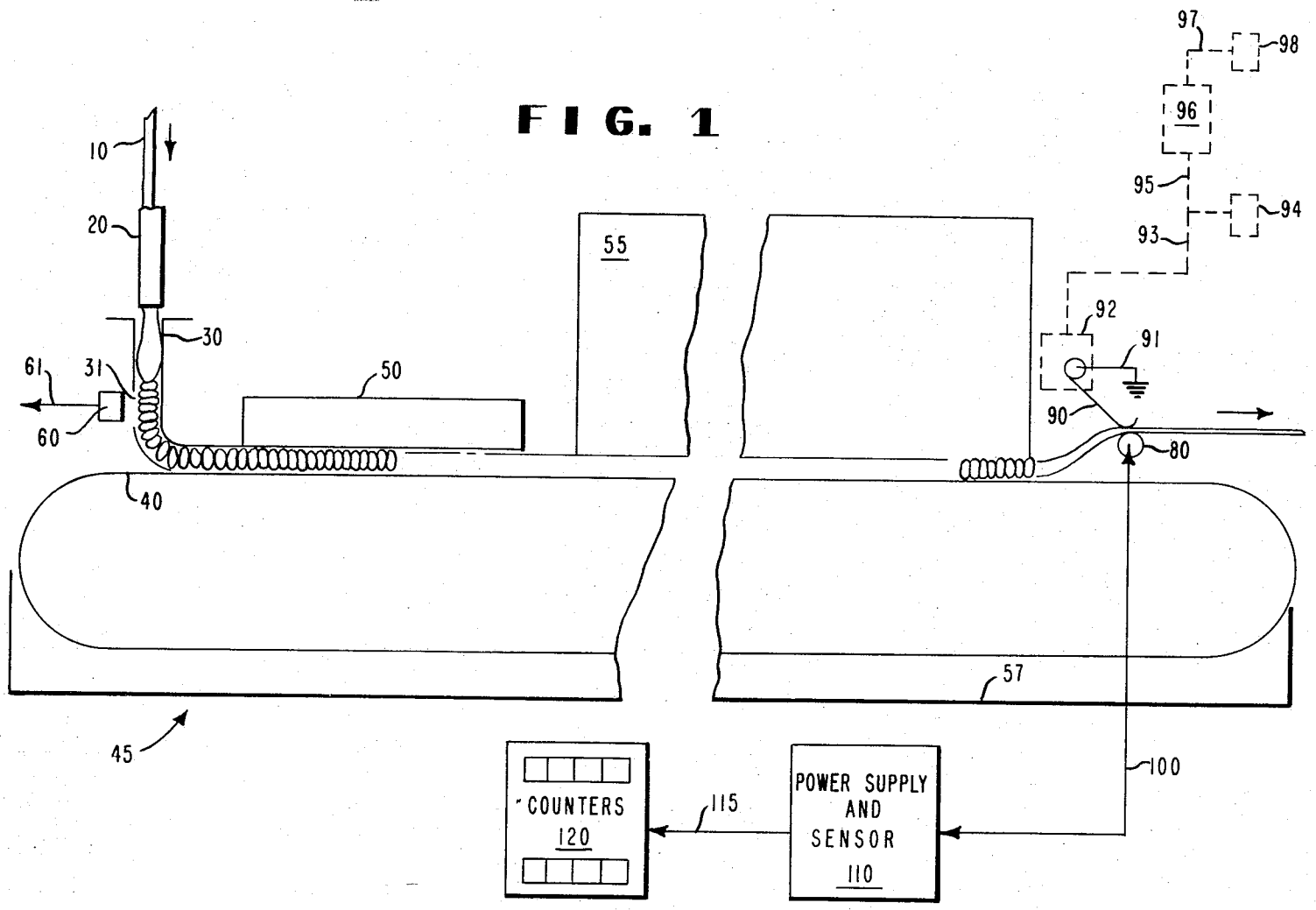
Figure 2:
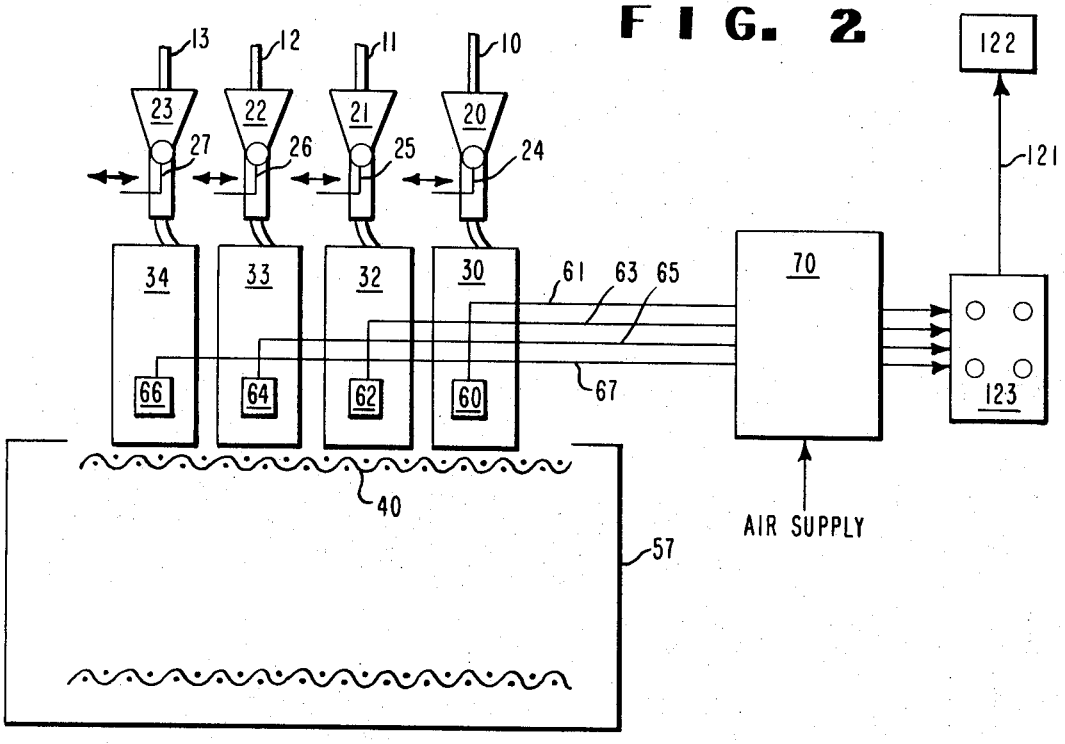
Figure 4:
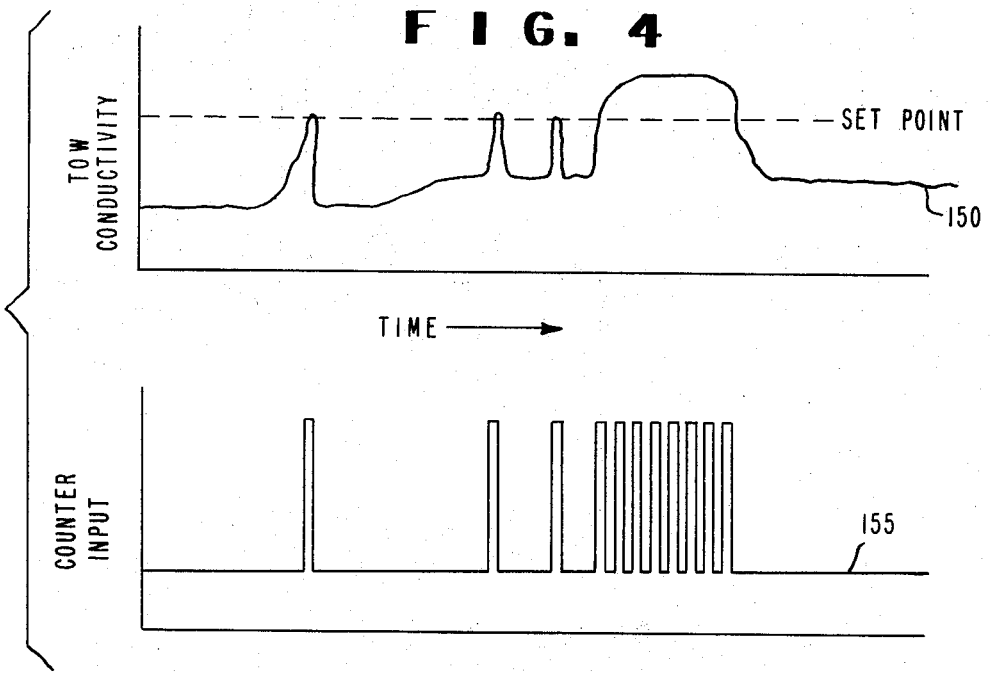
Figure 3:
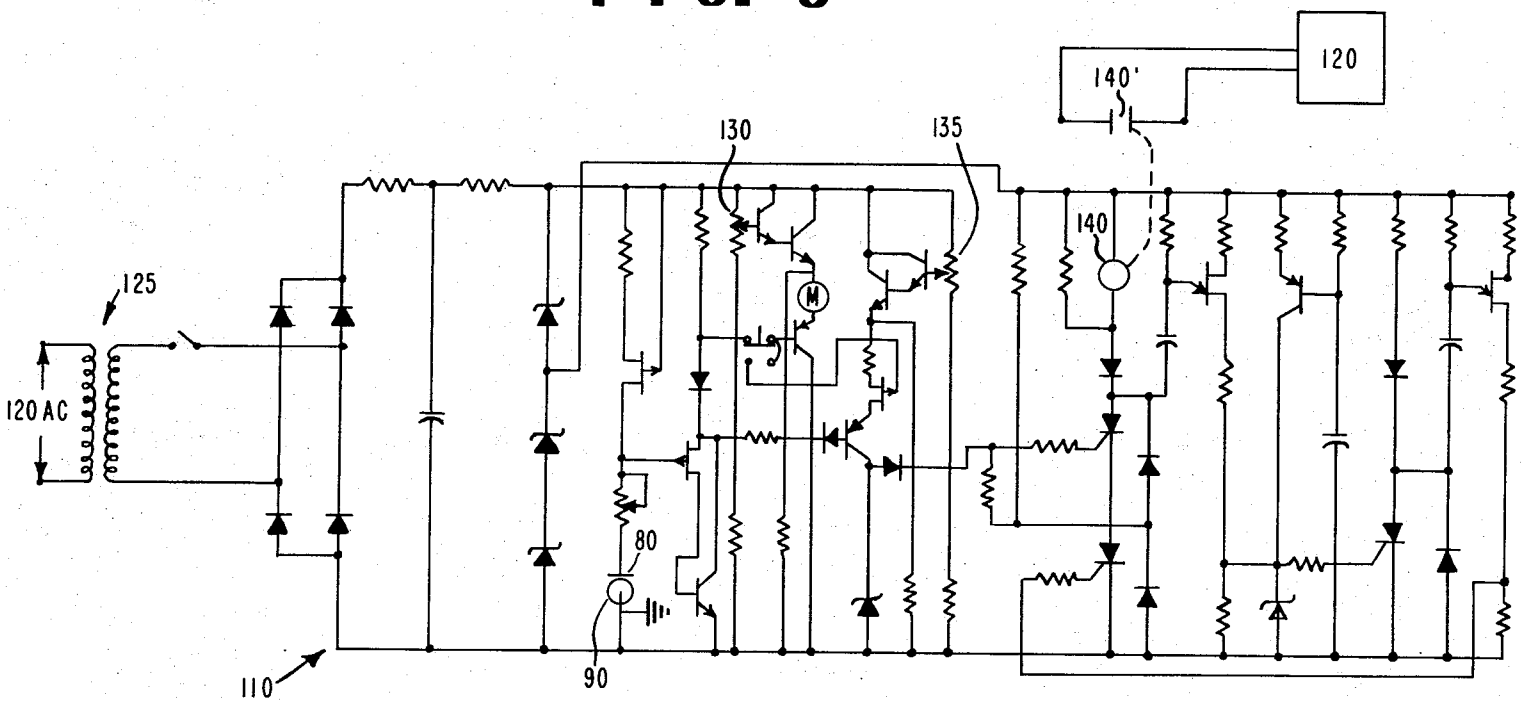

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 5, 1974

920 O.G. 9

T919,003
AUTOMATIC CONTROL FOR TOW DRYERS

Frank Melvin Heckendorn II, 118 Leonards Circle, Camden, S.C. 29020

Filed May 18, 1973, Ser. No. 361,409
**Int. Cl. F26b *13/00***
U.S. Cl. 34—55
3 Sheets Drawing. 4 Pages Specification

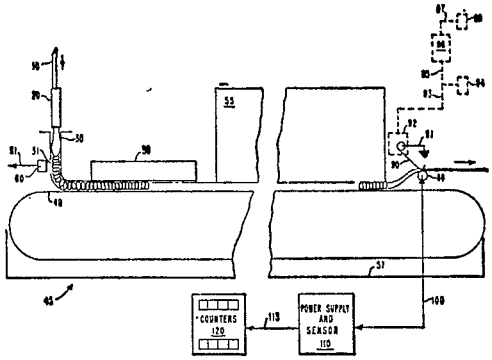

An apparatus combining void detection at the entrance and moisture detection at the exit of a tow dryer. The void detector comprises a pneumatic sensor and associated pressure switch and relay elements to provide readout and to stop the dryer motor drive upon detection of a void. Moisture is monitored by a continuous electrical conductivity measuring apparatus comprising a grounded feeler riding above and against the tow and a conducting guide below the tow which is attached to electrical circuitry arranged not only to count and alarm when moisture in the tow exceeds certain predetermined limits but also to provide a measure of length of such moisture spots in the tow. The grounded feeler also serves as a part of a detector of tow mechanical defects by being mounted to the input shaft of a pneumatic position transmitter which in turn is arranged to stop the tow moving means when actuated by movement of the feeler as a knot or similar defects passes under the feeler.

AUTOMATIC CONTROL FOR TOW DRYERS

Filed May 18, 1973 3 Sheets-Sheet 1

AUTOMATIC CONTROL FOR TOW DRYERS

Filed May 18, 1973 3 Sheets-Sheet 2

AUTOMATIC CONTROL FOR TOW DRYERS

Filed May 18, 1973 3 Sheets-Sheet 3